US009632711B1

(12) United States Patent
Obr

(10) Patent No.: US 9,632,711 B1
(45) Date of Patent: *Apr. 25, 2017

(54) PROCESSING FLUSH REQUESTS BY UTILIZING STORAGE SYSTEM WRITE NOTIFICATIONS

(71) Applicant: Western Digital Technologies, Inc., Irvine, CA (US)

(72) Inventor: Nathan Obr, Seattle, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/322,520

(22) Filed: Jul. 2, 2014

Related U.S. Application Data

(60) Provisional application No. 61/976,023, filed on Apr. 7, 2014.

(51) Int. Cl.
*G06F 3/06* (2006.01)
*G06F 12/08* (2016.01)
(Continued)

(52) U.S. Cl.
CPC .......... *G06F 3/0619* (2013.01); *G06F 3/0659* (2013.01); *G06F 3/0679* (2013.01);
(Continued)

(58) Field of Classification Search
CPC ............. G06F 12/0891; G06F 12/0804; G06F 12/0815; G06F 12/0686; G06F 12/0688;
(Continued)

(56) References Cited

U.S. PATENT DOCUMENTS 4,703,420 A 10/1987 Irwin
5,077,733 A 12/1991 Whipple
(Continued)

OTHER PUBLICATIONS

Serial ATA: High Speed Serialized AT Attachment, Revision 1.0a, Jan. 7, 2003, pp. 1-311.
(Continued)

*Primary Examiner* — Tuan Thai
*Assistant Examiner* — Glenn Gossage
(74) *Attorney, Agent, or Firm* — Knobbe, Martens, Olson & Bear, LLP

(57) ABSTRACT

Systems and methods for utilization of notification or ordering commands are disclosed that can enable more efficient processing of flush requests from software programs and increase data consistency in storage devices. For example, when an application requests that a data cache be flushed, a computing device may—instead of completely emptying the data cache—notify the application of a successful flush once relevant data of the application has been committed to non-volatile memory. Targeted notifications, which may identify the relevant data in the data cache, can limit the scope of a flush request, such that the speed and efficiency of the command is increased relative to a non-specific full-cache flush. Such increases in efficiency of flush requests may greatly increase the speed and efficiency of storage devices, and consequently the performance of programs utilizing such storage devices.

24 Claims, 8 Drawing Sheets

(51) Int. Cl.
*G06F 12/0804* (2016.01)
*G06F 12/0891* (2016.01)
*G06F 12/0868* (2016.01)

(52) U.S. Cl.
CPC ...... *G06F 12/0804* (2013.01); *G06F 12/0868* (2013.01); *G06F 12/0891* (2013.01)

(58) Field of Classification Search
CPC .. G06F 2212/69; G06F 3/0646; G06F 3/0619; G06F 3/0683; G06F 12/0866; G06F 12/0868; G06F 3/0659; G06F 3/0679
See application file for complete search history.

(56) References Cited

U.S. PATENT DOCUMENTS

| | | |
|---|---|---|
| 5,276,662 A | 1/1994 | Shaver, Jr. et al. |
| 5,465,338 A | 11/1995 | Clay |
| 5,590,299 A | 12/1996 | Bennett |
| 5,809,522 A * | 9/1998 | Novak ............... G06F 12/0842 711/118 |
| 5,860,089 A | 1/1999 | Ishii |
| 5,893,149 A * | 4/1999 | Hagersten ........... G06F 12/0808 711/113 |
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,618,788 B1 | 9/2003 | Jacobs |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,885 B1 | 2/2004 | Goodfellow |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |

(56) References Cited

U.S. PATENT DOCUMENTS

| | | |
|---|---|---|
| 6,874,065 B1 * | 3/2005 | Pong .............. G06F 12/0804 |
| | | 711/135 |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,082 B2 | 9/2005 | Gschwind et al. |
| 6,948,113 B1 | 9/2005 | Shaver |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,130,932 B1 | 10/2006 | Ghaffari |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,165,124 B2 | 1/2007 | Fujita et al. |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,457,921 B2 | 11/2008 | Gabryjelski et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,574,565 B2 | 8/2009 | De Souza |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |

(56) References Cited

U.S. PATENT DOCUMENTS

| | | |
|---|---|---|
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |

(56) References Cited

U.S. PATENT DOCUMENTS

| | | |
|---|---|---|
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,856,390 B1 | 10/2014 | Stevens |
| 2003/0084252 A1* | 5/2003 | Talagala ............... G06F 12/0866 711/135 |
| 2003/0236953 A1 | 12/2003 | Grieff et al. |
| 2004/0010625 A1 | 1/2004 | Lo et al. |
| 2004/0190554 A1 | 9/2004 | Galloway |
| 2005/0027894 A1 | 2/2005 | Ayyavu et al. |
| 2005/0027913 A1 | 2/2005 | Boecker et al. |
| 2005/0080842 A1 | 4/2005 | Takeuchi et al. |
| 2005/0102468 A1 | 5/2005 | Delaney et al. |
| 2005/0122991 A1 | 6/2005 | Golasky et al. |
| 2005/0186832 A1 | 8/2005 | Nemazie |
| 2006/0031612 A1 | 2/2006 | Bashford et al. |
| 2006/0075164 A1 | 4/2006 | Ooi |
| 2006/0248535 A1 | 11/2006 | Grover |
| 2006/0282709 A1* | 12/2006 | Shu ..................... G06F 11/0727 714/100 |
| 2007/0118768 A1 | 5/2007 | Wolford |
| 2007/0189619 A1 | 8/2007 | Liu et al. |
| 2007/0226385 A1 | 9/2007 | Liu et al. |
| 2007/0226411 A1* | 9/2007 | Ehrlich ............... G06F 12/0804 711/113 |
| 2007/0260756 A1 | 11/2007 | Tseng et al. |
| 2008/0005398 A1 | 1/2008 | Huffman |
| 2009/0006787 A1* | 1/2009 | De Souza ............. G06F 3/0611 711/156 |
| 2009/0113702 A1 | 5/2009 | Hogg |
| 2010/0306551 A1 | 12/2010 | Meyer et al. |
| 2011/0035553 A1* | 2/2011 | Shepstone ......... G06F 17/30902 711/135 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0086311 A1* | 4/2013 | Huang ................ G06F 13/1689 711/103 |
| 2014/0201424 A1 | 7/2014 | Chen et al. |

OTHER PUBLICATIONS

Serial ATA International Organization: Serial ATA Revision 2.6, High Speed Serialized AT Attachment, Feb. 15, 2007, 600 pages.

American National Standard for Information Technology, AT Attachment with Packet Interface 7, vol. 3, Serial Transport Protocols and Physical Interconnect (ATA/ATAPI-7 V3), ANSI INCITS 397-2005 (vol. 3), 305 pages.

American National Standard for Information Technology, AT Attachment with Packet Interface 7, vol. 2, Parallel Transport Protocols and Physical Interconnect (ATA/ATAPI-7 V2), ANSI INCITS 397-2005 (vol. 2), 250 pages.

American National Standard for Information Technology, AT Attachment with Packet Interface 7, vol. 1, Register Delivered Command Set, Logical Register Set (ATA/ATAPI-7 V1), ANSI INCITS 397-2005 (vol. 1), 393 pages.

Office Action dated Dec. 28, 2009 from U.S. Appl. No. 12/058,572, 18 pages.

Notice of Allowance dated Jun. 24, 2010 from U.S. Appl. No. 12/058,572, 14 pages.

"Barriers and journaling filesystems," LWN.net, http://lwn.net/Articles/283161, downloaded on Jul. 1, 2014, pp. 1-11.

"Write barrier," Wikipedia, the free encyclopedia, http://en.wikipedia.org/wiki/Write_barrier, downloaded on Jul. 1, 2014, 1 page.

"The end of block barriers," LWN.net, http://lwn.net/Articles/400541/, downloaded on Jul. 1, 2014, pp. 1-4.

"Chapter 16. Write Barriers," Fedora, http://docs.fedoraproject.org/en-US/Fedora/14/html/Storage_Administration_Guide/writebarr.html, downloaded on Jul. 1, 2014, pp. 1-2.

Leszek Urbanski, "Electromagnetic Disk Drive," Monolight, http://monolight.cc/2011/06/barriers-caches-filesystems/, downloaded on Jul. 1, 2014, pp. 1-8.

Office Action dated Nov. 23, 2015 from U.S. Appl. No. 14/322,594, 74 pages.

Nathan Obr, U.S. Appl. No. 14/322,594, filed Jul. 2, 2014, 46 pages.

* cited by examiner

PROCESSING FLUSH REQUESTS BY UTILIZING STORAGE SYSTEM WRITE NOTIFICATIONS

CROSS-REFERENCE TO RELATED APPLICATIONS

This application claims benefit under 35 U.S.C. §119(e) to U.S. Provisional Patent Application No. 61/976,023 titled "MANAGING CONSISTENCY IN STORAGE MEDIA" and filed on Apr. 7, 2014, the disclosure of which is hereby incorporated by reference in its entirety. This application is related to co-pending application Ser. No. 14/322,594 filed on Jul. 2, 2014, entitled "IDENTIFICATION OF DATA COMMITTED TO NON-VOLATILE MEMORY BY USE OF NOTIFICATION COMMANDS", the disclosure of which is also hereby incorporated by reference in its entirety.

BACKGROUND

Computing systems generally utilize non-volatile storage media, such as hard disk drives, to store information, and to ensure the availability of stored information across power cycles. In some instances, computing systems or applications executed by computing systems require that data be committed to a disk drive in a specific order, such that subsequent read requests to the disk drive result in retrieval of the expected data.

However, the systems and protocols used to interact with storage devices such as disk drives may be unable to ensure such a specific order of writes. For example, multithreaded systems may allow multiple applications or processes to access a disk drive simultaneously or near-simultaneously, and in doing so, may reorder various operations performed by the applications or processes. Further, current disk drives or other non-volatile storage media can utilize volatile cache memory in an attempt to increase speed and efficiency of the drive. Use of cache memory, and protocols associated therewith, may result in reordering of operations prior to commitment to a non-volatile memory. Reordering of operations to the non-volatile memory may result in unexpected values being written to or read from the non-volatile memory by the computing system, and therefore result in errors.

To compensate for the out-of-order environment in which writes can be committed to the non-volatile memory, an application has the option to ensure that all of its previous writes have completed before completion of the next write by performing an application file operation flush, which causes all data of all previously completed writes to be forced out of the system and committed to the storage device's permanent media. However, implementation of a flush command on the storage device is generally time consuming, and can degrade performance. Consequently, many storage subsystems (or software/firmware/hardware associated therewith) decline to perform flush commands. Ignoring a program's (e.g., application's or operating system's) flush commands may increase performance relative to performing the commands, but results in potential data inconsistency.

An alternative technique for ensuring data consistency is to serialize all ordered writes throughout the host computing device and mark each one as a Forced Unit Access (FUA). Use of FUA writes ensures that each write is committed to non-volatile media before the command is completed. However, due to the delay in completion, FUA commands tend to be significantly slower than a typical write command. As a result, many storage subsystems (or software/firmware/hardware thereof) fail to respect a program's request to perform FUA writes.

BRIEF DESCRIPTION OF THE DRAWINGS

Systems and methods that embody the various features of the invention will now be described with reference to the following drawings, in which.

DETAILED DESCRIPTION

Figure 1:
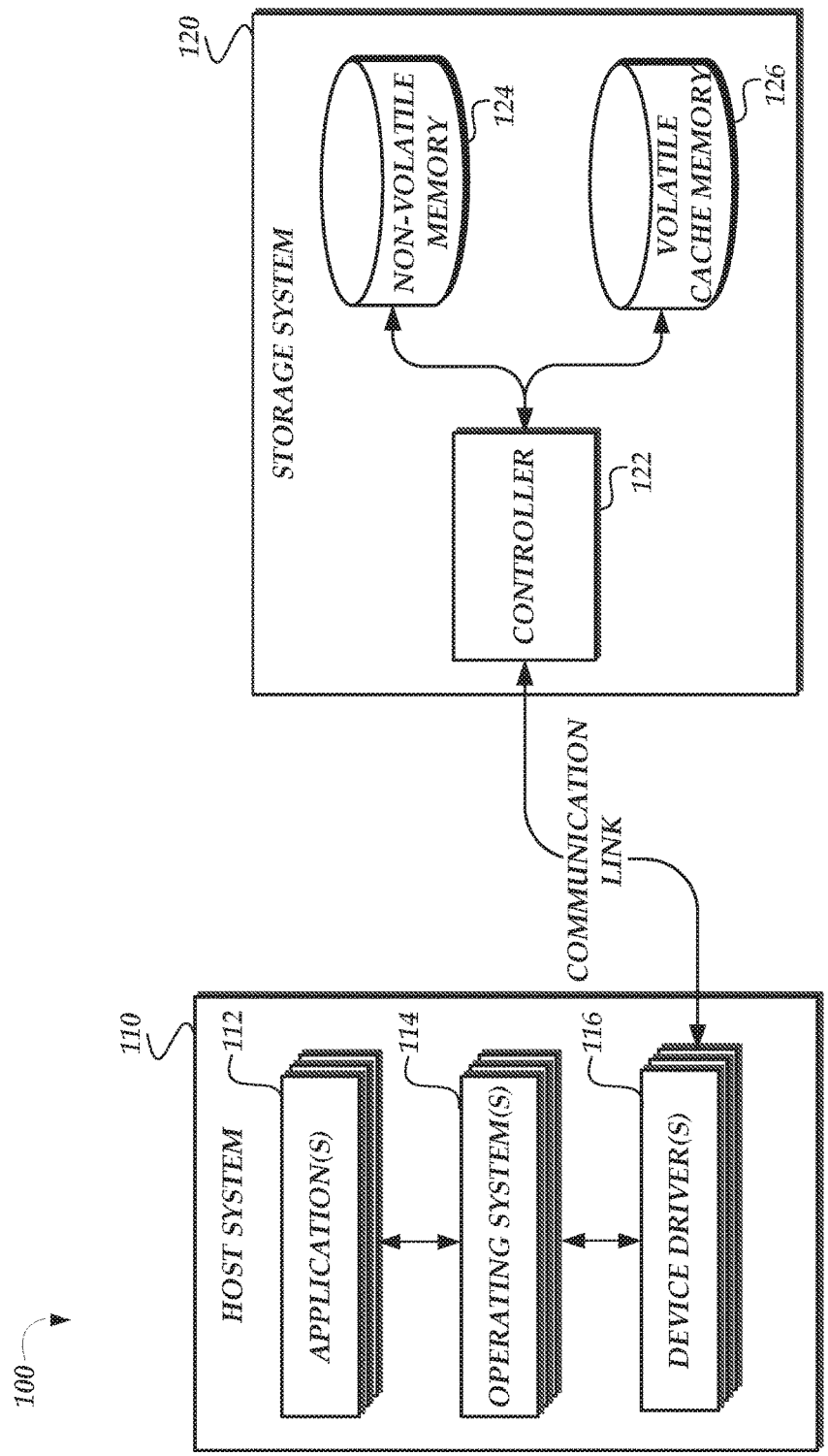
FIG. 1 is a block diagram illustrating a combination of a host system and a data storage system according to some embodiments of the present disclosure.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Generally, some embodiments of systems and methods described herein address the performance issues related to the use of flush commands and FUA writes by providing a storage device enabled to notify an application (or other element of a computing system) when a specified set of criteria have been satisfied. For example, a storage device such as a disk drive or solid state drive may be configured to receive and process notification requests from a device driver or other component of a computing system. Each notification request may specify one or more previous commands completed by the storage device, and request that the disk drive notify the device driver when the data associated with the command has been committed to non-volatile memory. In order to facilitate such notifications, the device driver may label or tag each command (or data item associated with a command) issued to the storage device with an identifier. In general, a data item is any data referenced by a command, which may include, for example, data to be written at one or more logical block addresses (LBAs) of a storage device, data objects referenced by software programs, data records forming portions of databases, or any other collection or organization of data to be stored within a storage device. This identifier may be unique, or may be shared among multiple commands or data items. Each notification command may specify a collection of identifiers for previous write commands (or data items associated therewith) that, in some embodiments, must be completed prior to transmission of a notification to the storage device. By managing notifications related to data items, a device driver or other element of a computing system can ensure data items are committed to non-volatile memory of a storage device according to the desired order of an application.

In one embodiment, an application's, operating system or other program's desired write order may be determined based on the use of flush request or FUA write requests. For example, a device driver of a storage device may interpret each flush request as a requirement that all previously completed write commands be committed prior to completion of the flush request. In order to distinguish the timing of requested writes, the device driver may utilize tags or other identifiers previously associated with each write (or set of writes) request(s). On receiving a flush request, the device driver may issue a notification command, that a notification be sent by the storage device when all previously tagged completed write commands have been committed. Subsequent to receiving the notification by the storage device, the device driver can report completion of the flush request to the application, operating system or other program. As will be described in more detail below, utilization of notifications can enable successful processing of an application's flush request without requiring a storage device to commit all previously cached data and without monopolizing communications with the storage device. Therefore, use of notifications can ensure data consistency of all commands completed prior to the flush request without incurring the performance penalties associated with performing flush commands or FUA writes.

In another embodiment, a device driver may interpret each flush request as a requirement that all previously transmitted data related to a specific file or program be committed to non-volatile memory prior to completion of the flush request. Illustratively, an application issuing a flush request may solely be interested in committing writes to one or more files associated with that application. Accordingly, a device driver may utilize command identifiers to distinguish between commands requested by various applications or modifying various files. On receiving a flush request, the device driver may issue a notification command, that a notification be sent by the storage device when all data associated with the specific application or specific file have been committed to non-volatile memory (e.g., destaged from a cache of the storage device). Subsequent to receiving the notification by the storage device, the device driver can report completion of the flush request to the application. Advantageously, notifications related to specific applications or files may be received more quickly than non-application or non-file specific notifications (e.g., due to the lower number of completed commands required for the notification), thereby increasing the speed and efficacy of the application's flush request.

In yet another embodiment, an operating system or other component of a computer system can utilize ordering commands to enforce the ordering of writes on a storage device (e.g., to implement efficient write barriers). Write barriers generally ensure that commands executed prior to the write barrier are committed to non-volatile memory prior to commands executed after implementation of the write barrier. Accordingly, an operating system may receive flush requests from an application, and interpret each flush request as creation of a write barrier. The operating system may immediately notify the application of completion of the flush request, and thereafter, as will be described below, ensure that any previous requested writes are committed prior to subsequent requested writes. In one instance, implementation of write barriers may utilize storage device notification commands, such that an operating system or device driver may queue requests received after establishing a write barrier until after receiving a notification that all previous completed write commands have been committed on a storage device. In another instance, a storage device may be modified to support implementation of ordering commands, enabling specification by a device driver of an order that specified data items should be committed to non-volatile memory.

While aspects of the present application may be described with reference to write commands, embodiments of this disclosure may be utilized with respect to any request to store data to non-volatile memory of a storage device. For example, embodiments of the present application may be utilized in connection with "put" commands, where a storage device is in communication with a host system over a communication network. Accordingly, notification commands may be used to determine whether data items corresponding to a "put" command have been committed to non-volatile memory of, for example, a network attached storage (NAS) system.

The above will be more fully appreciated and understood with reference to the following description.

System Overview

FIG. 1 illustrates an operating environment 100 according to some embodiments of the present disclosure, including a host system 110 and a data storage system (storage device) 120. As shown in FIG. 1, the host system 110 generally includes one or more logical applications 112, operating systems 114, and device drivers 116. Such applications 112, operating systems 114, and device drivers 116 can represent logical software modules executed by underlying hardware components of the host system 110 (not shown within FIG. 1). Hardware components of the host system 110 may include, for example, one or more physical processors, application-specific integrated circuits (ASICs), field programmable gate arrays (FPGAs), communication busses, volatile or non-volatile storage media, input devices, or output devices. Components of the host system 110 which enable logical applications 112, operating systems 114, and device drivers 116 are well known to those skilled in the art, and therefore will not be described in more detail herein.

The applications 112 and operating systems 114 may provide various functionalities to users of the host system 110 which require or are assisted by storage of data within the storage system 120. Accordingly, the host system may include one or more device drivers 116 configured to enable transmission of data storage commands (e.g., read or write commands) to the storage system 120. Such commands may be transmitted via a communication link between the host system 110 and storage system 120. In one embodiment, the communication link may include a storage bus, such as a serial ATA (SATA) storage bus or other storage bus utilizing the advanced host controller interface (AHCI) standard. In another embodiment, the communication link may include a system bus, such as a Peripheral Component Interconnect (PCI) or PCI Express bus. In still other embodiments, the communication link may include network communication links (e.g., Ethernet links enabling communication via transmission control protocol (TCP)/internet protocol (IP) standards).

The data storage system 120, which may correspond, for example, to a hard disk drive (HDD), solid state hybrid drive (SSHD), or solid state drive (SSD), includes a controller 122, a non-volatile memory 124, and a volatile cache memory 126. In one embodiment, the non-volatile memory 124 includes magnetic storage media (e.g., a magnetic disk). In another embodiment, the non-volatile memory 124 includes a solid state memory implemented, for example, by flash integrated circuits, Chalcogenide RAM (C-RAM), Phase Change Random Access Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, electrically erasable programmable read only memory (EEPROM), Ferroelectric Random Access Memory (FeRAM), Magnetoresistive RAM (MRAM), other discrete NVM (non-volatile memory) chips, or any combination thereof. The non-volatile memory of FIG. 1 is generally configured to permanently or semi-permanently store data written by the host system 110 to the storage system 120, such that written data is available across multiple power cycles of the storage system 120. In some embodiments, the data storage system 120 may correspond to an SSHD with both magnetic storage media and some forms of solid state memory storage media. In other embodiments, the data storage system 120 may include an array of non-volatile storage devices with one or more types of media. For example, the data storage system 120 may include multiple HDDs, SSHDs, SSDs, or some combinations of them.

The volatile cache memory 126 of FIG. 1 can generally correspond to any memory configured to temporarily store data, such that data within the volatile cache memory 126 is not guaranteed to be stored across a power cycle of the storage system 120. In one embodiment, the volatile cache memory 126 is associated with write speeds higher than the non-volatile memory 124, such that the volatile cache memory 126 may temporarily store data that is to be written to the non-volatile memory 124. Accordingly, the volatile cache memory 126 may implement a "disk cache" or "disk buffer" on the storage system 120.

The controller 122 is configured to receive data and/or storage access commands from device drivers 116 of a host system 110. Storage access commands communicated by a storage interface coupled with the controller 122 can include write data and read data commands issued by the host system 110. The controller 122 can execute the received commands with respect to the non-volatile memory 124. In some instances, the controller 122 can utilize the volatile cache memory 126 to temporarily store data written by the host system 110, prior to committing such data to the non-volatile memory 124. Storage of data in the volatile cache memory 126 may generally be referred to as "caching" such data. Thereafter, the controller can selectively transfer data from the volatile cache memory 126 to the non-volatile memory 124. Transfer of data from the volatile cache memory 126 to the non-volatile memory 124 can generally be referred to as "destaging" the data. In some instances, the controller 122 may implement "native command queue (NCQ)" functionality. Generally described, NCQ functionality enables the controller 122 to prioritize the order at which data is destaged from the volatile cache memory 126 in order to optimize the performance of the non-volatile memory 124. Because NCQ functionality is well known within the art, it will not be further described herein.

In accordance with some embodiments of the present disclosure, the controller 122 may be configured to receive and process notification commands received from the host system 110. Each notification command may identify one or more items of data which the host system 110 previously requested be written to the non-volatile memory 124. As will be described in more detail below, each item of data transmitted from the host system 110 to the storage system 120 may include an identifier associated with the data item by, e.g., the device driver 116. Accordingly, a notification command may identify data items by use of associated identifiers.

The controller 122 may be configured to utilize the identifiers within the notification command as criteria for generating a corresponding notification to the host system that each identified data item has been committed to the non-volatile memory 124. For example, the controller 122 may receive a notification command identifying three previous data items requested to be written to the non-volatile memory 124, e.g., data items 'A', 'B', and 'C'. Each data item may initially reside within the volatile cache memory 126, awaiting commitment to the non-volatile memory 124. Thereafter, the controller may monitor for the commitment of the identified data items (e.g., data items 'A', 'B', and 'C') to the non-volatile memory 124. On destaging of the identified data items, and commitment of such data items to the non-volatile memory 124, the controller 122 can generate a notification to the host system 110, indicating that the identified data items (e.g., data items 'A', 'B', and 'C') have been committed to the non-volatile memory 124.

The operating system 114, device driver 116, or other modules within the host system 110 can utilize the notification functionality of the storage system 120 in order to process flush requests of software programs (e.g., applications or operating systems), without requiring a corresponding flush command to the device. In some examples below, for the sake of brevity, some of the flush requests will be described as being issued by applications. It is to be understood that such flush requests apply generally to any such write requests issued by any software program. As will be appreciated by one skilled in the art, implementing a flush command on a storage system (e.g., the storage system 120) is generally associated with significant performance degradation. Specifically, implementation of such a flush command may require the storage system 120 to completely quiesce the volatile cache memory 126, without regard to the specific data items included within the volatile cache memory 126. Moreover, implementation of such a flush command may monopolize communications along the communication link, such that additional commands cannot be transmitted to the storage system 120 prior to completion of the flush command.

Utilization of notification commands, in accordance with aspects of this disclosure, may enable many disadvantages of traditional flush commands on storage systems to be overcome. Moreover, in some instances, notification commands may be implemented without requiring modification of applications 112 or operating systems 114. Specifically, an application may generally utilize a flush request to ensure that all previous data written by the application has been committed to the non-volatile memory 124. Accordingly, a device driver 116 may be configured to associate data written by the application with an identifier. On receiving a flush request by the application, the device driver 116 can utilize the identifier to identify each previous data item written. The device driver 116 can further generate a notification command including the identifier, and transmit the notification command to the storage system 120. Once all identified data has been committed to the non-volatile memory 124, the controller 122 can generate a corresponding notification to the device driver 116. The device driver 116 may then notify the application that the application's flush request has completely successfully. Thus, an application's flush request may be successfully processed without requiring use of a corresponding flush command on the storage system 120. Various additional embodiments will be described in more detail below.

Identification of Data Items

Figure 2:
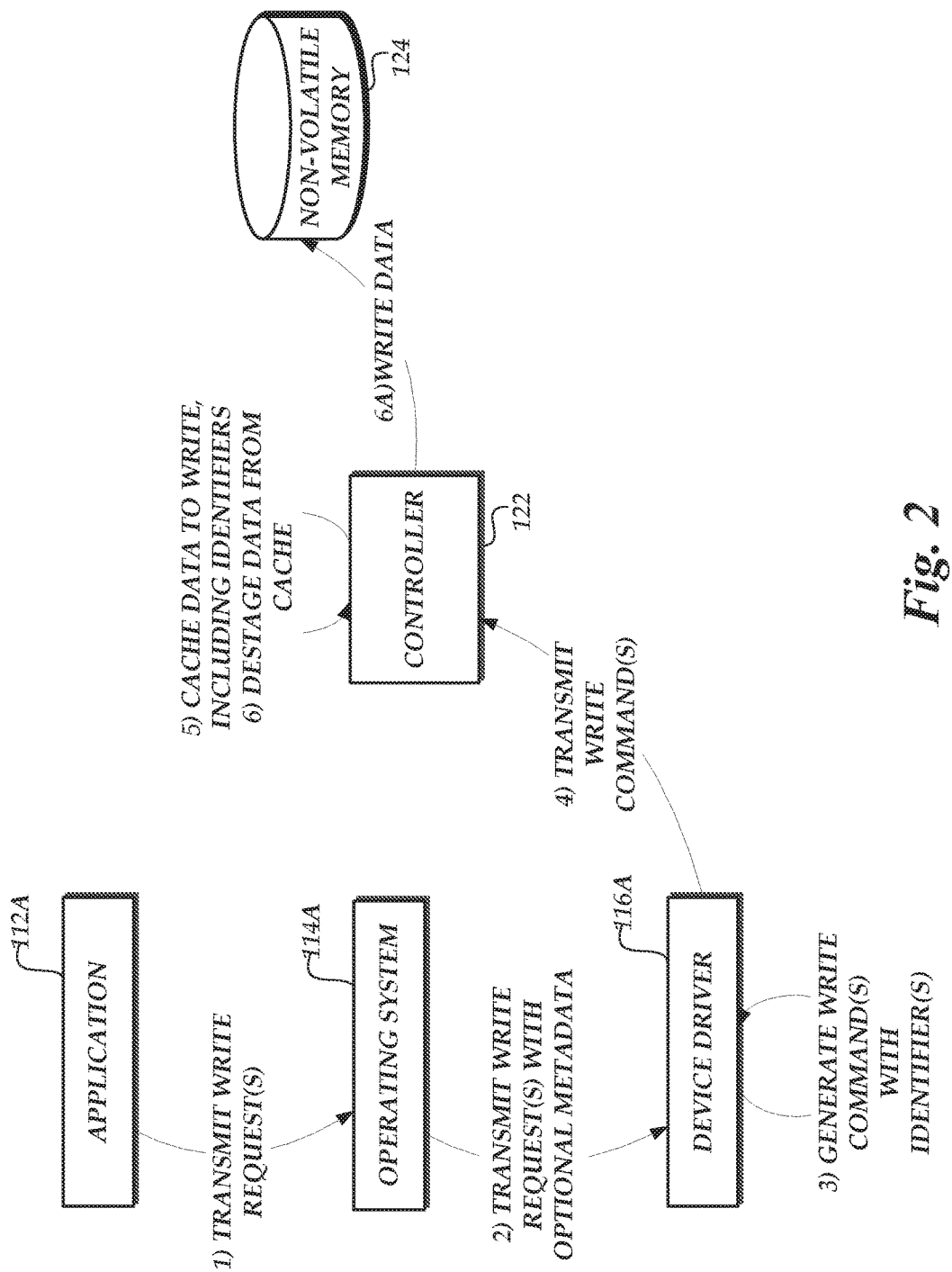
FIG. 2 is a flow-diagram illustrating interactions of a host system and data storage system to include identifiers within write commands, or data items associated with write commands, to facilitate notifications according to some embodiments of the present disclosure.

FIG. 2 is a flow diagram illustrating interactions of various elements of the host system 110 and storage system 120 of FIG. 1 in order to supplement write commands with identifiers (e.g., for later use in generating notification commands), according to some embodiments. Specifically, the interactions of FIG. 1 begin at (1), where an application 112A transmits a write request to the operating system 114A. A write request may correspond to any request to write data to the non-volatile memory 124. For example, a write request may include a request to write a data item to a specific file. One skilled in the art will appreciate that elements of the host system 110, such as the operating system 114A, may provide various levels of abstraction in storing data items into the non-volatile memory 124. For example, the operating system 114A may establish a file system, enabling the application 112A to write data items to the non-volatile memory 124 without requiring knowledge of the underlying storage structure within the non-volatile memory 124.

At (2), the operating system processes the received write request, and transmits the request to the device driver 116A. Though not shown within FIG. 2, one skilled in the art will appreciate that various additional abstraction layers may exist within the host system 110, and there write requests may pass through multiple abstraction layers before being received at the device driver 116A. In one embodiment, prior to transmitting the write request to the device driver 116A, the operating system 114A may supplement the write request with additional information regarding the application 112A, the data item associated with the write request, or the write request itself. For example, the operating system 114 may supplement the write request with an identity of the application 112A or a logical identifier of the data item requested to be written (e.g., a file descriptor, a record locator, or an object key of the data item). As will be discussed in more detail below, metadata associated with a write request may be utilized by the device driver 116A to limit the scope of applicability of an application's flush requests. For example, when receiving a flush request from the specific application 112A, the device driver 116A may send a notification command to the controller 122 requesting notification when all previous data writes associated with that application 112A have been committed (e.g., without requiring data writes by other applications 112 to be committed). Such targeted notifications may further limit the resources necessary to successfully process flush requests. In other embodiments, the device driver 116A may receive write requests from the operating system 114A without metadata. Advantageously, the ability for the device driver 116A to successfully process flush requests without reference to metadata may enable embodiments of the present disclosure to be implemented without modification of a current operating system on the host system 110.

At (3), after receiving the write request, the device driver 116A generates the write command with an identifier, which may subsequently be used in generating notifications regarding the write command or the corresponding data item. In one embodiment, the device driver 116A modifies the write command itself. For example, the device driver 116A may modify one or more bits or fields of the corresponding SATA command. In another embodiment, the device driver 116A may augment the data item to be written to the non-volatile memory 124 (e.g., by prepending or appending an identifier to the data item). In one embodiment, a set of potential identifiers may be selected according to the potential performance impact of the identifier on communication with the controller 122. For example, where an identifier is embedded within a SATA command, a set of potential identifiers may be selected such that all possible identifiers may be represented without expanding the total data size of the SATA command. Illustratively, a five bit identifier may be used, resulting in 32 possible identifiers. The use of larger identifiers may allow for more write commands to be uniquely identified, but may result in a more substantial impact on performance. In another embodiment, pre-existing identifiers for data items, such as record locators or object keys, may be utilized by the device driver in generating notification commands in accordance with some embodiments of the present disclosure. In some such embodiments, the pre-existing nature of a data item identifier may allow interaction (3) to be omitted. Selection of identifiers will be described in more detail below with respect to FIG. 5A. In one embodiment, a flush request may be evaluated to determine whether it corresponds to a page file. Since the contents of a page file become irrelevant if there is an unexpected power loss, flushing a page file is wasteful behavior. Consequently, if a flush request is determined to correspond to a page file, in one embodiment the request is handled differently from what is described in the various examples shown. Instead, such a request may be assigned a reserved identifier (such as value 0x00) that will not go out in a notification request. As a result, the page file is not flushed. This implementation may be applied to other embodiments such as those shown in FIGS. 3A and 3B.

Thereafter, at (4), the write command and corresponding data item, as modified to include an identifier, are transmitted to the controller 122 via the communication link. In one embodiment, the write command is transmitted via SATA or other storage protocol over a storage bus. In another embodiment, the write command is transmitted via a system bus, such as a PCI bus (e.g., by adherence to the non-volatile memory express (NVMe) specification). In still more embodiments, the write command may be transmitted via a network communication link (e.g., via TCP/IP).

At (5), on receiving the write command and corresponding data item, the controller 122 caches the data item into the volatile cache memory 126 (not shown in FIG. 2) for later commitment to the non-volatile memory 124. Caching may be utilized, for example, to allow write commands to be transmitted to the controller 122 at a faster rate than corresponding data items are committed to the non-volatile memory 124, or to allow write commands to be transmitted asynchronous to commitment of corresponding data items to the non-volatile memory 124.

At (6), the data item previously cached to the volatile cache memory 126 is destaged by the controller 122 including committing the data item to the non-volatile memory 124 at (6a). While interaction (6) (including interaction (6a)) is depicted in FIG. 2 as immediately following interaction (5), various additional interactions may occur between (5) and (6) (including interaction (6a)). For example, the controller 122 may receive additional write commands, and cache data items of such commands to the volatile cache memory 126. As a further example, the controller 122 may destage various other data items previously cached within the volatile cache memory 126, and commit those other data items to the non-volatile memory 124. Unordered processing of cached data items may be especially prevalent where the controller 122 is configured to implement NCQ technologies. Still further, as will be described in more detail below, prior to (6), the controller 122 may receive a notification command requesting notification to the device driver 116A on commitment of a data item to the non-volatile memory 124.

Processing of Flush Requests

Figure 3A:
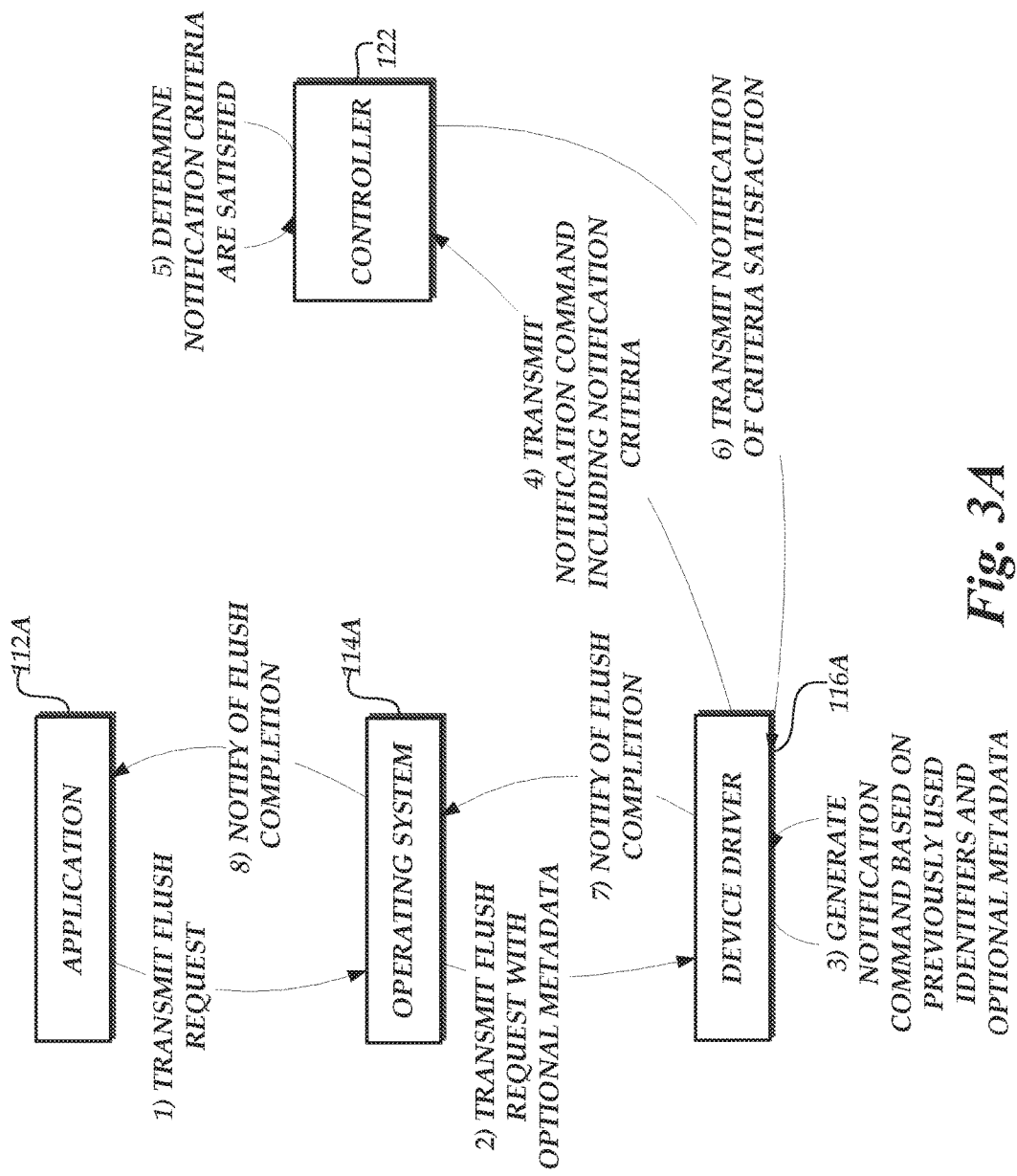
FIG. 3A is a flow-diagram illustrating the processing of a program's flush command based at least in part on the use of a corresponding notification command, in accordance with some embodiments of the present disclosure.
Figure 3B:
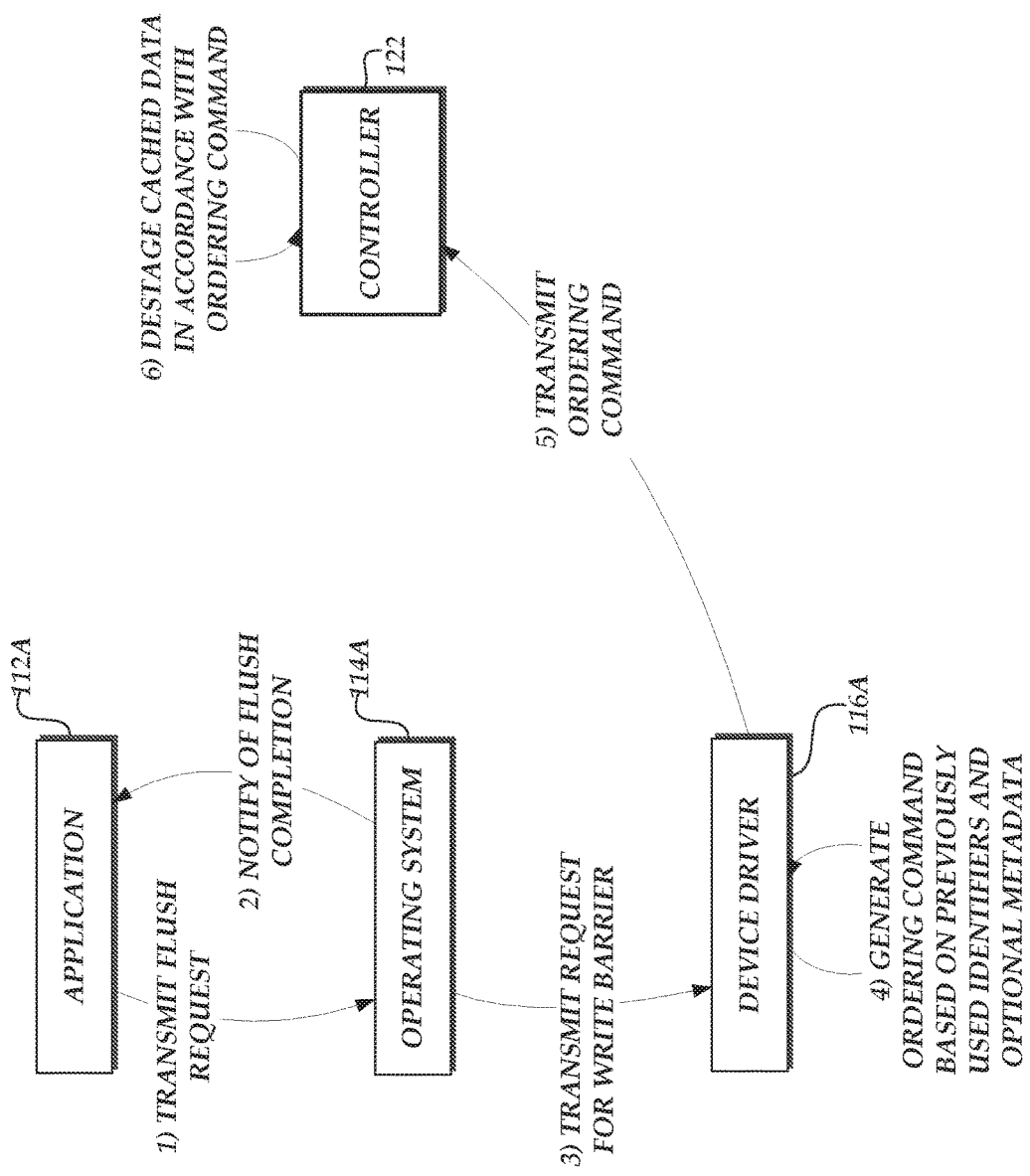
FIG. 3B is a flow-diagram illustrating the processing of a program's flush command based at least in part on the use of a corresponding ordering command, in accordance with some embodiments of the present disclosure.

FIGS. 3A and 3B are flow diagrams illustrating various embodiments for processing flush requests from an application 112A in accordance with the present disclosure. Specifically, FIG. 3A represents a flow diagram enabling the use of notifications or targeted notifications to determine when an application's flush request is satisfied by a storage system 120. FIG. 3B represents a flow diagram enabling the implementation of write barriers to ensure that an application's flush request is satisfied by a storage system 120.

With reference to FIG. 3A, at (1), the application 112A transmits a flush request to the operating system 114A. Generally described, a flush request can correspond to a request by the application 112A that all data previously transmitted to the storage system 120 be committed to non-volatile memory 124. At (2), the operating system 114A transmits the flush request to the device driver 116A for processing. Optionally, the operating system 114A may also transmit metadata regarding the flush request to the device driver 116A. As discussed above, metadata can generally provide additional information regarding the application 112A, the data requested to be flushed by the application 112A (e.g., a particular file, record, or object accessed by the application 112A), or additional data to be used by the device driver 116A to specifically target the applicability of the flush request.

At (3), the device driver 116A processes the flush request by generating a specific notification command corresponding to the flush request. In one embodiment, the device driver 116A can determine that the flush request may be satisfied when data items of all previous write commands transmitted to the controller 122 have been committed to the non-volatile memory 124. Accordingly, the device driver 116A may determine a set of identifiers corresponding to outstanding write commands (e.g., write commands not yet known by the device driver 116A to have been committed to the non-volatile memory 124), and generate a notification command for such identifiers. In one instance, the set of identifiers corresponding to outstanding write commands can include all identifiers assigned to write commands since a previous flush request was received. In another instance, the set of identifiers corresponding to outstanding write commands can include any identifier for which a notification of commitment to the non-volatile memory 124 has not yet been received at the device driver 116A.

As an illustrative example, the device driver 116A may have previously received three write commands, and subsequently transmitted the three write commands to the controller 122 and received the notification of the write commands completion. Prior to transmission, the device driver 116A may have associated the write commands (and corresponding data items) with three identifiers (e.g., 'A', 'B', and 'C'). On receiving a flush request, the device driver 116 may be unaware of whether the three data items of the three commands have been committed to the non-volatile memory 124. Accordingly, the device driver may generate a notification command corresponding to the three identifiers, 'A', 'B', and 'C'. As will be described below, the controller 122 may then process the notification command, and once it has determined that the three identifiers have been committed to memory, it may notify the device driver 116A.

In some embodiments, notifications may be targeted, such that only a subset of data items corresponding to outstanding write commands must be committed to non-volatile memory 124 in order to satisfy the notification. In one instance, targeting may be based on a specific file in use by the application 112A. As described above, a flush request can generally correspond to a request by the application 112A that all data previously transmitted to the storage system 120 be committed to non-volatile memory 124. However, in many instances, the application 112A may be unaware of many of the data items previously transmitted to the storage system 120 (e.g., because such data items were transmitted by alternative applications). Accordingly, the application 112A's flush request may be satisfied by ensuring that all previous data items associated with the application 112A have been committed to the non-volatile memory 124 (as opposed to all previous data items, regardless of source). Accordingly, the notification generated by the device driver 116A may be targeted specifically to previous data items associated with the application 112A, or with previous data items associated with a file used by application 112A.

As an illustrative example, assume again that three previous data items (e.g., data items 'A', 'B', and 'C') are not yet known to the device driver 116A as having been committed to non-volatile memory 124. In such an instance, only a single data item, such as data item 'A', may be associated with the application 112A or a file written by the application 112A. Therefore, the device driver may assume that the applications 112A's flush request will be successfully processed after commitment of the data item 'A' to the non-volatile memory 124, without regard to the commitment of data items 'B' and 'C'. The device driver 116A can therefore create a notification specifically targeted to data item 'A'. Due to the limited criteria associated with the targeted notification, the criteria of targeted notifications may be satisfied more quickly than general notifications. As described in more detail below, this may result in quicker completion of the application 112A's flush request.

With continued reference to FIG. 3A, at (4), the notification command generated by the device driver 116A is transmitted to the controller 122. Thereafter, the controller 112 may utilize the criteria of the notification command to determine when a corresponding notification should be transmitted to the device driver 116A. While not shown within FIG. 3A, the notification criteria may be maintained by the controller 122 for future processing. Illustratively, the controller 122 may maintain a set of notification criteria in the volatile cache memory 126 of FIG. 1 or in various other components not illustrated in FIG. 1 (e.g., within a state machine implemented in various hardware components).

While not shown in FIG. 3A, after receiving a notification, the controller 122 may continue to function normally. Accordingly, the controller 122 may continue to process previous commands received from the device driver 116A (e.g., by destaging cached data items and committing such data items to the non-volatile memory 124) and continue to communicate with the device driver 116A to receive additional commands. At a point in time subsequent to receiving the notification command, the controller 122, at (5), can determine that all criteria of the notification command have been satisfied. Illustratively, if the notification command requires that data items corresponding to identifiers 'A', 'B', and 'C' are committed to non-volatile memory 124, the controller 122 can determine that such criteria is satisfied. In one embodiment, the determination that specifically identified data items have been committed to non-volatile memory 124 may be based at least in part on a determination that no data items associated with the specified identifiers (e.g., 'A', 'B', and 'C') are currently included within the volatile cache memory 126.

After determining that the criteria of the previously received notification command are satisfied, the controller 122, at (6), transmits a notification of criteria satisfaction to the device driver 116A. The notification may be transmitted according to any communication channel between the controller 122 and the device driver 116A. For example, where the controller 122 and the device driver 116A communicate via a storage bus, the notification may be transmitted via a storage protocol, such as SATA. Where the controller 122 and the device driver 116A communicate via a communication network, network packets may be used to transmit a notification. Still further, where the controller 122 and the device driver 116A communicate via a system bus, alternative notifications may be utilized. For example, in one embodiment, the controller 122 may utilize an interrupt signal to transmit a notification to the device driver 116A. In instances where interrupt signals are utilized, specific information regarding the notification may be placed in a memory of the host system 110 or storage system 120 for retrieval by the device driver 116A. For example, the controller 122 may maintain a portion of memory in which a set number of bits are allocated for each potential identifier assigned to data items. Thereafter, the controller 122 may update the portion of memory to indicate whether each identifier is associated with cached data items. Illustratively, where each potential identifier is assigned a single bit within memory, a value of one may indicate that the identifier is associated with a cached data item on the storage system 120, while an indicator of zero may indicate that the identifier is not associated with a cached data item on the storage system 120. In such an instance, the controller 122 may utilize processor interrupts to indicate that the device driver 116A should inspect the assigned memory for information regarding the status of data items.

Based on the transmitted notification, the device driver is made aware that the previously identified data items have been committed to the non-volatile memory 124 of the storage system 120. At (7), the device driver 116A notifies the operating system 114A that the flush request has been successfully processed. Similarly, at (8), the operating system 114A notifies the application 112A that the flush request has been successfully processed. Accordingly, the interactions of FIG. 3A enable processing of flush requests by applications without utilization of a corresponding flush command on the storage system 120, and without disrupting functionality of the controller 122 (e.g., in receiving commands, caching data items, and destaging such data items).

With reference to FIG. 3B, an additional embodiment for processing flush requests of an application 112 will be described. Specifically, in FIG. 3B, the controller 122 is configured to receive and process ordering commands from the device driver 116A. An ordering command, which may also be referred to as a 'write barrier' command generally includes ordering criteria specifying for destaging data items within the storage system 120. For example, an illustrative ordering command may specify that data items associated with identifier 'A' must be destaged (and committed to non-volatile memory 124) prior to destaging data items associated with identifier 'B' (or prior to processing a command associated with the identifier 'B'). As will be described, ordering commands may therefore be used to efficiently process flush requests of applications, and to implement write barriers on a storage system 120 without otherwise disrupting the functionality of the storage system 120.

Specifically, at (1), the application 112A transmits a flush request to the operating system 114A. As noted above, a flush request generally corresponds to a request by the application that all prior data items be committed to non-volatile memory 124 of the storage system 120 prior to processing subsequent requests to the storage system 120. Because the controller 122 is configured to implement ordering commands, the operating system 114A can ensure that this request is complied with by the controller 122 (as discussed in more detail below). The operating system 114A may therefore immediately (or substantially immediately) notify the application 112A of completion of the flush request.

Thereafter, at (3), the operating system 114A transmits a request to the device driver 116A to implement a write barrier. Generally described, the request may correspond to a request that all data items previously transmitted to the device driver 116A for writing be committed to non-volatile memory 124 prior to commitment of subsequent data items. In one embodiment, the operating system 114A may include metadata with the request. As described above, metadata may include, e.g., data related to the application 112A or to the file written by the application 112A.

After reception of the write barrier request, at (4), the device driver 116A generates an ordering command implementing the write barrier on the controller 122. In one embodiment, the ordering command identifies a set of previous write commands, or data items associated with previous write commands, as required to be committed to the non-volatile memory 124 prior to committing data items of any subsequent write commands. For example, the ordering command may include, as ordering criteria, identifiers of a set of commands not known to the device driver 116A to be committed to the non-volatile memory 124 (e.g., identifiers utilized since the last ordering command was transmitted). In another embodiment, an ordering command may identify only a select set of commands not known to the device driver 116A to be committed to the non-volatile memory 124. Illustratively, the device driver 116A may utilize metadata provided by the operating system 114 to generate an ordering command targeting previous write requests associated with the application 112. Accordingly, if three identifiers are associated with outstanding data items, but only a single identifier is associated with the application 112A, the device driver 116A may generate an ordering command requiring that data items associated with that single identifier be committed to non-volatile memory 124 prior to processing subsequent commands.

Thereafter, at (5), the device driver 116A transmits the generated ordering command, including ordering criteria (e.g., identifiers associated with previous data items), to the controller 122. As discussed above, the controller 122 is configured thereafter, at (6), to destage cached data items in accordance with the ordering command. Illustratively, the controller 122 may delay processing of subsequent commands received from the device driver 116A until each data item identified within the ordering command has been destaged and committed to non-volatile memory 124. In this manner, any subsequent write requests from the application 112A can be ensured to be committed after previous write requests, therefore satisfying the flush request. Advantageously, use of ordering commands to implement write barriers can enable nearly instantaneous completion of flush requests, without requiring a notification to be generated and transmitted from the controller 122. In some instances, however, ordering commands may require modification to additional elements of the host system 110, such as the operating system 114A.

Effects of Flush Commands on Work Queues

Figure 4A:
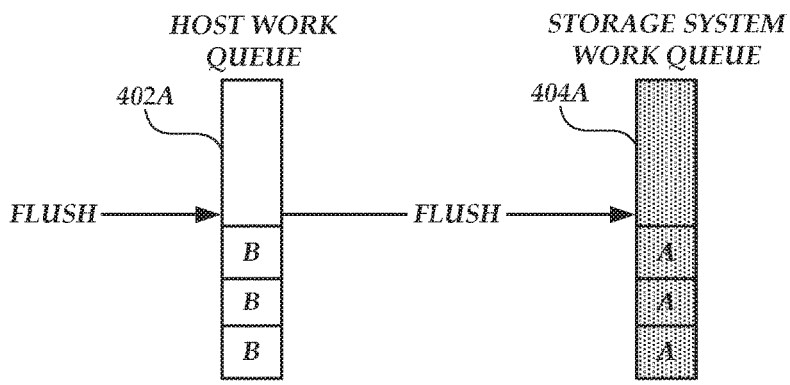
FIG. 4A is a graphical illustration or visualization of effects on a logical work queue when implementing a traditional flush command.
Figure 4B:
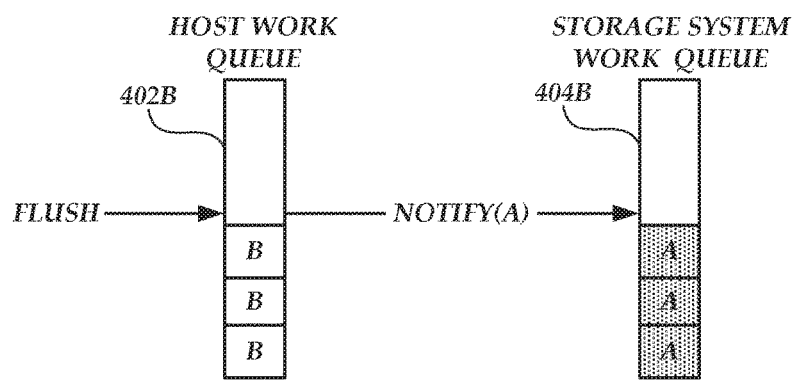
FIG. 4B is a graphical illustration or visualization of effects on a logical work queue when implementing a notification command according to some embodiments of the present disclosure.
Figure 4C:
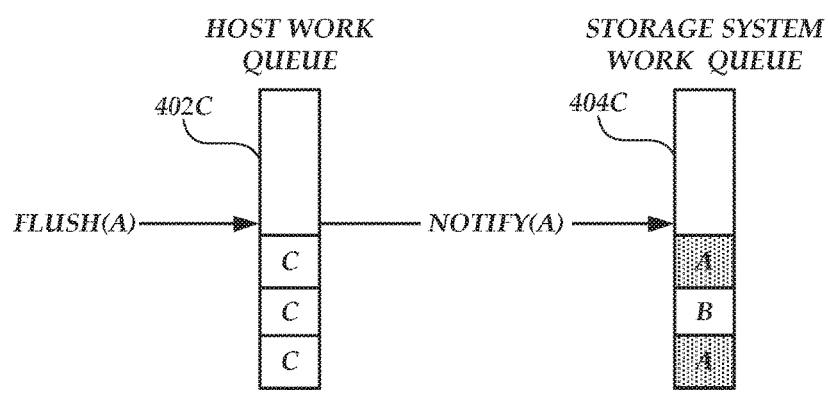
FIG. 4C is a graphical illustration or visualization of effects on a logical work queue when implementing a targeted flush command according to some embodiments of the present disclosure.

With reference to FIGS. 4A-4C, illustrative graphical representations of work flows of the host system 110 and the storage system 120 are depicted according to various embodiments of the present disclosure. Specifically, FIG. 4A is a depiction of the effect of a traditional flush command on each work flow; FIG. 4B is a depiction of the effect of a general notification command on the work flows; and FIG. 4C is a depiction of the effect of a targeted flush command on the work flows. One skilled in the art will appreciate that the work flows depicted within FIGS. 4A-4C are intended to be illustrative abstractions, and may not represent any singular queue maintained by individual elements of the host system 110 or the storage system 120. In addition, while illustrative labels are used within FIGS. 4A-4C for clarity of discussion, these labels may be independent of the identifiers for data items discussed above, and therefore may or may not correspond to such identifiers.

With reference to FIG. 4A, an illustrative host work queue 402A and storage system work queue 404A are depicted according to a traditional flush command. Specifically, the storage system work queue 404A includes three data items, labeled in FIG. 4A as 'A', which have previously been transmitted to the storage system 120 for commitment to the non-volatile memory 124. Similarly, the host work queue 402A includes three data items, labeled in FIG. 4A as 'B', to subsequently be transmitted to the storage system 120 for storage in the non-volatile memory 124. As shown in FIG. 4A, the host system 110 may receive a flush command (e.g., from an application 112), requesting that each data item within the storage system work queue 404A be destaged prior to completion of the flush command. Traditionally, because the host system 110 is not aware of the contents of the storage system work queue 404A, the host system 110 must transmit a flush command to the storage system 120. Thereafter, the storage system work queue 404A must be completely quiesced prior to receiving any additional data items. Because the entirety of the storage system work queue 404A must be quiesced subsequent to reception of a flush command, the storage system work queue 404A is shown completely shaded within FIG. 4A. As noted above, complete quiescing of the storage system work queue 404A, and inability to transmit the data items 'B' to the storage system work queue 404A during quiescing, may be associated with significant performance degradation.

With reference to FIG. 4B, an illustrative host work queue 402B and storage system work queue 404B are depicted during use of a notification command in accordance with embodiments of the present disclosure. Specifically, in FIG. 4B, three data items 'A' may be outstanding in the storage system work queue 404B, while three data items 'B' are awaiting placement in the storage system work queue 404B from the host work queue 402B. As in FIG. 4A, the host work queue 402B may then receive a flush command, requesting that each data item within the storage system work queue 404B be destaged. However, rather than transmitting the flush command to the storage system work queue 404B, the host system 110 can generate a notification command requesting that a notification be transmitted to the host system 110 subsequent to destaging data items 'A' from the storage system work queue 404B. Within FIG. 4B, such a notification is depicted during transmission to the storage system work queue 404B as "Notify(A)." As described above, the storage system 120 may thereafter continue to process the storage system work queue 404B, and generate a notification to the host system 110 subsequent to destaging each data item 'A'. In contrast to FIG. 4A, only the data items 'A' have been targeted by the transmitted command, and therefore only the data items 'A' are shown as shaded within FIG. 4B. Because no flush command has been transmitted to the storage system 120, the storage system work queue 404B remains available to receive additional data items to be written. Illustratively, because only data items 'A' are targeted by the notification command, data items 'B' may continue to be transmitted to the storage system work queue 404B. Moreover, the storage system 120 remains able to process items from the storage system work queue 404B in any order (e.g., to increase efficiency in the use of the underlying physical medium by implementing NCQ technologies). Therefore, it will be apparent that the use of notification commands significantly decreases the resources necessary to process flush commands of applications or other programs.

With reference to FIG. 4C, an illustrative host work queue 402C and storage system work queue 404C are depicted during use of a targeted notification command in accordance with embodiments of the present disclosure. Specifically, in FIG. 4C, two data items 'A' and one data item 'B' may be outstanding in the storage system work queue 404C, while three data items 'C' are awaiting placement in the storage system work queue 404C from the host work queue 402C. As in FIGS. 4A and 4B, the host work queue 402C may then receive a flush request, requesting that each data item within the storage system work queue 404C be destaged. The host system 110 may further be aware that the flush request was received from an application associated with data items 'A' (e.g., as determined based on metadata regarding the flush request). Accordingly, the host system 110 may interpret the flush request as a request to destage data items 'A' from the storage system work queue 404B. Therefore, the host system 110 can generate a notification command requesting notification on destaging of the data items 'A'. Because only data items 'A' are targeted by such a notification command, only data items 'A' are shaded within FIG. 4C. The storage system 110 may thereafter monitor the storage system work queue 404C for destaging of the data items 'A', and subsequently notify the host system 110 of the destaging. As only a portion of the storage system work queue 404C need be destaged prior to such notification, use of targeted notifications may further reduce the time necessary to successfully process a received flush request of an application 112 or other program.

Routines for Implementing Write Notifications

Figure 5A:
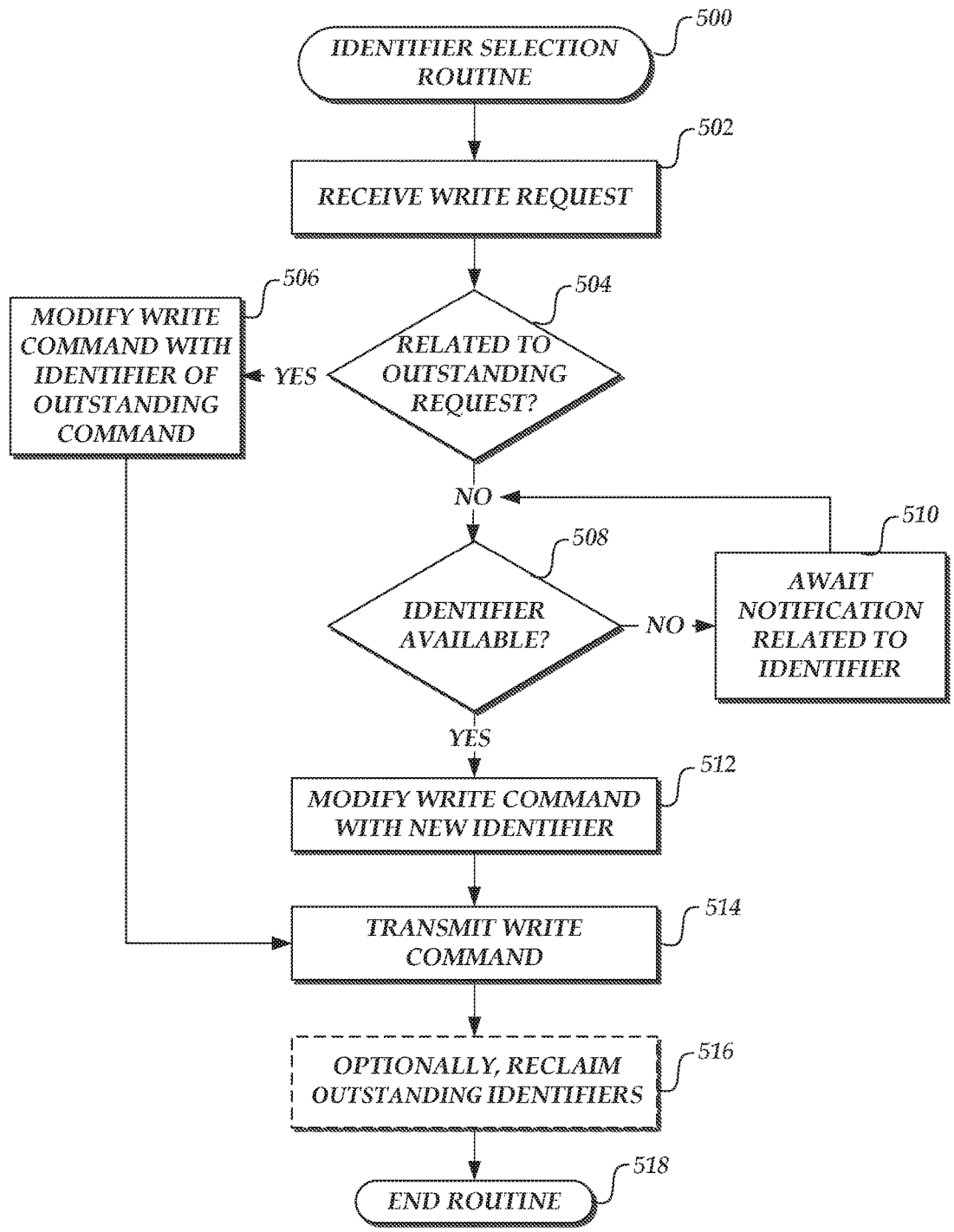
FIG. 5A is an illustrative routine for selecting identifiers to associate with write commands, or data items associated with write commands, according to some embodiments of the present disclosure.
Figure 5B:
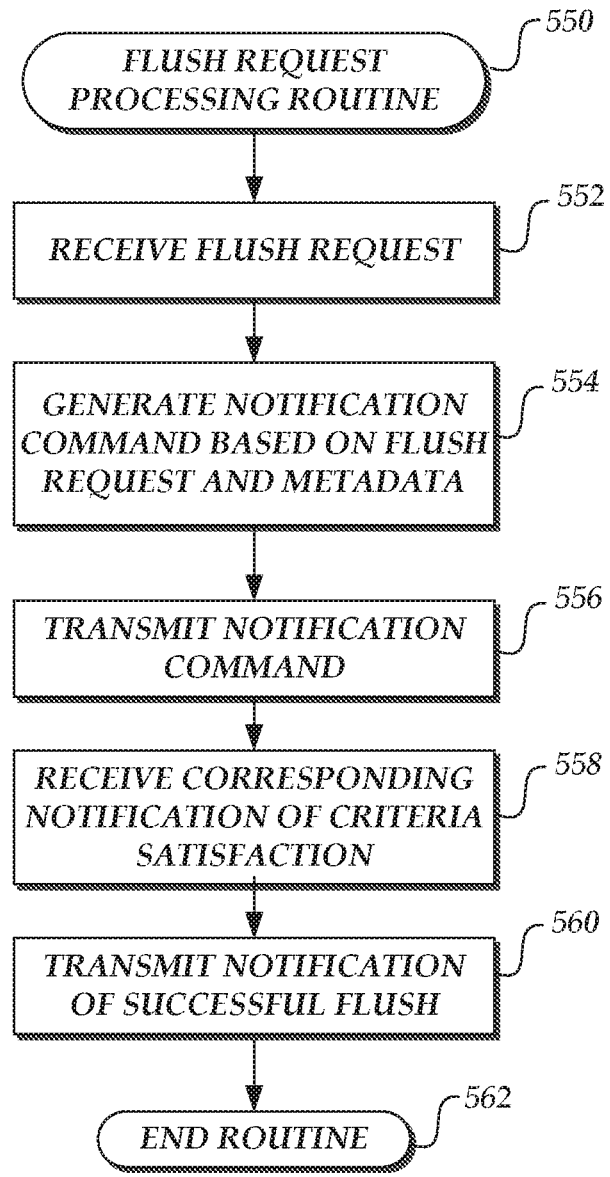
FIG. 5B is an illustrative routine for processing a flush command according to some embodiments of the present disclosure.
Figure 6:
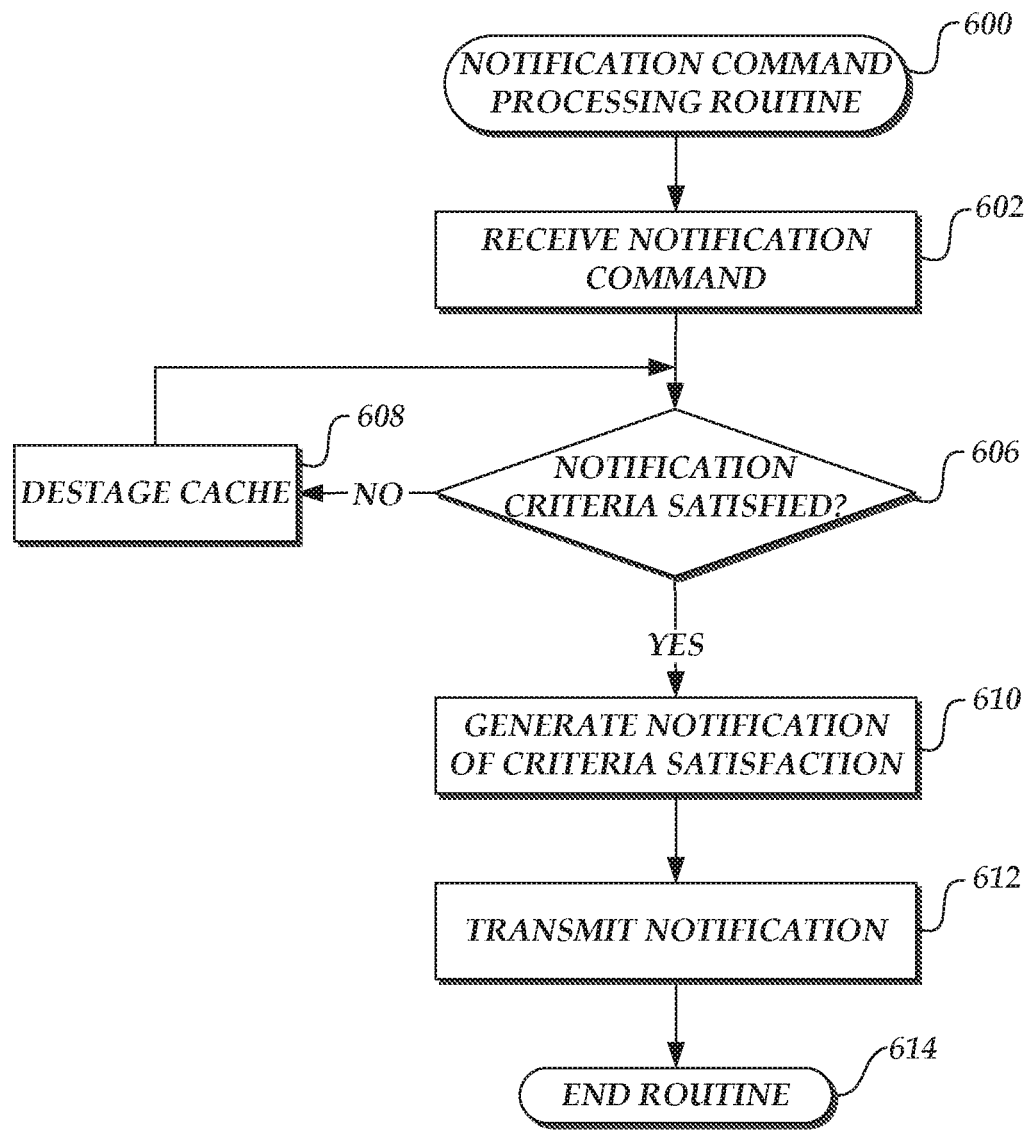
FIG. 6 is an illustrative routine for processing a received notification command according to some embodiments of the present disclosure.

FIGS. 5A-5B and 6 illustrative routines for processing flush commands based on the use of write notifications, in accordance with some embodiments of the present disclosure. Specifically, FIG. 5A illustrates one routine for selecting and associating a write command (or data items corresponding to the write command) with an identifier. FIG. 5B illustrates one routine for utilizing identifiers, and notification commands associated with the identifiers, to process a flush command received from a software program (e.g., an application or operating system). The routines of FIGS. 5A and 5B may be carried out, for example, by a device driver, operating system, or other component of a host system. FIG. 6 illustrates one routine for processing a received notification command, and generating a corresponding notification after satisfaction of the notification command's criteria. The routine of FIG. 6 may be implemented, for example, by a controller of a storage system.

With reference to FIG. 5A, the routine 500 begins at block 502, where the device driver receives a write request from a program (e.g., an application or operating system) on the host system. Subsequently, at block 504, the device driver determines whether the received write request is associated with previously received (e.g., outstanding) write requests. Association between write requests may be determined, for example, based on the address of the write request (e.g., if the write request is associated with writing data items to the same file, the same or adjacent logical block address, etc.), based on metadata associated with the write request (e.g., an application making the write), or a combination thereof. If the write request is associated with a previous write request, the device driver at block 506 may generate a write command with the identifier associated with the previous write request. Use of the same identifier for associated write commands may be advantageous to reduce the total number of identifiers used by the device driver. In addition, as a flush request can be expected to be directed to all associated write commands (or data items thereof), use of the same identifier for associated write commands may not be associated with significant performance degradation. On the contrary, the use of a single identifier to reference multiple associated write commands may reduce the complexity of corresponding notification commands, thereby increasing performance. Thereafter, the routine 500 continues at block 514, discussed below.

In the instance that the device driver determines, at block 504, that the current write command is not associated with a previous identifier or previously received (e.g., outstanding) write request, the routine continues at block 508, where the device driver determines whether any identifiers are available to be associated with the write command. As discussed above, a set of identifiers for use by the device driver may be selected according to any number of criteria. In one embodiment, the set of identifiers may be selected such that an identifier may be included within a write command (or a data item thereof) without substantially increasing the transmission time of the write command or the data item. For example, identifiers may be selected such that they utilize previously reserved bits within a write command protocol. In another embodiment, the device driver may utilize characteristics of the data item when selecting an identifier. For example, where a component of the host system, such as the operating system, has previously associated the data item with a unique identifier, the device driver may continue to utilize such an identifier for the purposes of generating notification commands. Illustratively, pre-existing identifiers may include universally unique identifiers (UUIDs) utilized by a host system or storage device, such as record locators or object keys.

In some instances, the device driver may utilize a new identifier for each flush request received from a program. For example, the device driver may, on reception of a flush request, increment a currently used identifier, and utilize the incremented identifier for subsequent write commands. Because each flush request may be associated with a corresponding notification, the device driver may, subsequent to use, release an identifier as available after receiving a notification corresponding to the identifier. In this manner, the device driver may implement a rotating identifier pool for each write command. Advantageously, use of a rotating identifier pool based on received flush requests may require little or no metadata to be received at the device driver.

In another embodiment, the device driver may utilize a new identifier for each set of associated write commands (e.g., each file written to, each application performing a write, etc.). For example, where two applications are simultaneously writing to a storage system, the device driver may utilize different identifiers for each application. The device driver may increment the identifier of an individual application when that application transmits a flush request. In this manner, flush requests of an individual application are not required to affect the identifiers associated with the write commands of other applications. Similarly to as described above, the device driver may designate any identifier associated with an outstanding notification command as unavailable, and subsequent to receiving the notification command, designate the identifier as available.

In the instance that the device driver determines, at block 508, that no identifier is currently available (e.g., when all current identifiers are associated with outstanding notification commands, other files, or other programs), the routine continues at block 510, where the device driver awaits a notification corresponding to a currently unavailable identifier. As noted above, on receiving a notification that data items associated with a previously-unavailable identifier have been committed to non-volatile memory of the storage system, the device driver can designate the identifier as available. The routine 500 may then return to block 508 for recognition of the newly-available identifier.

In the instance that the device driver determines, at block 508, that an identifier is available for association with a write command (or data items thereof), the routine 500 continues at block 512, where the write command is modified with the available identifier. In one instance, the write command itself may be associated with the identifier (e.g., by inserting a bit pattern of the identifier within the write command). In another instance, the data items associated with the write command may be modified to include the identifier (e.g., by prepending, appending, or otherwise encoding the data item with the identifier).

Thereafter, the routine continues to block 514, where the device driver transmits the modified write command to the storage system (e.g., to a controller) for subsequent processing. Illustratively, the storage system may cache the data item associated with the write command for subsequent commitment to non-volatile memory. The storage system may also maintain a record of the identifier associated with the write command (and data items thereof), in order to process corresponding notification commands.

Optionally, at block 516, the device driver may attempt to reclaim previously used identifiers. Reclamation may be beneficial, for example, if the pool of identifiers available to the device driver has fallen below a predetermined threshold. In one embodiment, the device driver may attempt to reclaim identifiers by generating notification commands corresponding to the identifiers, and transmitting such notification commands to the storage system. Subsequent to receiving a notification that all data items associated with an identifier have been committed to non-volatile memory of the storage system, the device driver can then designate the identifier as available. Routines to generate and process notification commands will be described in more detail below. In another embodiment, reclamation of previously used identifiers may be accomplished at least in part based on aggregation of previously used identifiers. Illustratively, the device driver may be programmed to aggregate "stale" identifiers to a single identifier, to increase the overall number of available identifiers. Staleness of an identifier may be determined, for example, based on the number of flush requests received or amount of time passed since the identifier was assigned to a write command. On determining that multiple identifiers should be aggregated, the device driver can send an aggregation command to the storage system (e.g., to a controller) specifying each source identifier (e.g., identifiers to be aggregated) and a resultant identifier (the identifier to which each source identifier should be aggregated). In response, the controller 122 can identify any outstanding data items with a source identifier, and alter each data item to be associated with the resultant identifier. In some instances, aggregation may trigger a notification to the device driver that a source identifier is no longer associated with any cached data items awaiting commitment to non-volatile memory. The routine may thereafter end at block 518.

With reference to FIG. 5B, one illustrative routine 550 for processing a flush request received from a program will be described. As noted above, the routine 550 may be implemented, for example, by a device driver within a host system. The routine 550 begins at block 552, where a flush request is received at the device driver from a program, such as an application. In one embodiment, the received flush request may include metadata related to the request, such as an identity of the program which generated the flush request.

At block 554, the device driver generates a notification command based on the received flush request. As described above, the notification command includes criteria related to previously used identifiers. In one embodiment, the criteria of the notification command may be targeted based on metadata of the flush request. For example, the notification command can be associated with previously used identifiers of a specific program or specific data file. Illustratively, if the flush request is received from a specific application, the notification command can be associated with identifiers utilized for write commands of the specific application (e.g., since the previous flush request of the specific application). In this manner, notification commands can be specifically targeted to data items associated with a specific application or file. While notification commands are depicted in FIG. 5B as generated based on a flush request and metadata, in some embodiments, the notification command may include criteria specifying all identifiers used since a previous flush request (e.g., all identifiers associated with data items potentially outstanding on the storage system for which notification commands have not already been transmitted).

At block 556, the generated notification command is transmitted to the storage system (e.g., to a controller within the storage system). As will be described in more detail below with respect to FIG. 6, the storage system may then utilize the criteria of the notification command to determine whether identified data items have been committed to non-volatile memory. Subsequent to satisfaction of the criteria, the storage system can generate a notification to the device driver, which is received at block 558. As noted above, the notification may be received via any available communication channel, including a storage bus, system bus, or communication network. For example, the notification may be transmitted via the SATA protocol, the TCP/IP protocol, or via a processor interrupt signal. Illustratively, this notification indicates that each data item associated with an identifier indicated within the notification command has been destaged from an internal cache and committed to non-volatile memory. Thereafter, at block 560, the device driver transmits to the requesting component (e.g., the application or program which issued the flush request) an indication that the flush request has succeeded. At block 562, the routine 550 ends.

With reference to FIG. 6, one illustrative routine 600 for processing received notification commands at a storage system will be described. The routine 600 begins at block 602, where a notification command is received from a host system (e.g., from a device driver). As noted above, the notification command includes criteria for identifying data items that potentially reside within the volatile cache memory of the storage system. For example, the notification command may include one or more identifiers associated with the data items.

At block 606, the storage system determines whether the criteria of the notification command have been satisfied. In one embodiment, the storage system may inspect cache memory to determine whether any data items associated with identifiers of the notification command are awaiting destaging. In the instance that no data item associated with an identifier of the notification command exists within the cache memory, the storage system can determine that the notification criteria have been satisfied, and the routine 600 proceeds to block 610, described below.

Alternatively, if the notification criteria are not yet satisfied at block 606, the routine 600 proceeds to block 608, where the storage system continues to process data items by destaging data items from the cache memory and committing data items to non-volatile memory. During implementation of block 608, the storage system may continue to communicate with the host system to receive write commands, read commands, notification commands, or otherwise provide available functionality. The routine 600 then returns to block 606, to determine whether the criteria of the notification command have been satisfied, as described above. This routine 600 continues to loop in this manner until the criteria of the notification command have been satisfied (e.g., until data items in the cache have been destaged such that no data item is associated with an identifier of the notification command).

Thereafter, the routine 600 continues to block 610, where the storage system generates a notification indicating that the criteria of the notification command have been satisfied. At block 612, the notification is transmitted to the host system via any available communication channel (e.g., via a storage bus, system bus, or communication network). As noted above, such a notification may be utilized by the host system to indicate that a flush request has been successfully processed.

While described above according to illustrative embodiments, the routines of FIGS. 5A-5B and 6 may be modified to include various alternative or additional elements. For example, in embodiments where pre-existing identifiers for data items are present (e.g., in the form of a UUID for a data item), the routine 500 of FIG. 5A may be modified to utilize such UUIDs, or may be omitted. As a further example, in instances where a storage device implements native command queuing, the routine 600 may be modified to include queuing of a notification command into a logical work queue of the storage device. Accordingly, the storage device may process the notification command in a similar manner to other "queued" commands. For example, the storage device may select the notification command for processing from the NCQ work queue only after the criteria associated with the notification command have been satisfied. In this manner, a notification command may be conceptually viewed as a "queuable" command. This is in contrast to traditional flush commands, which are conceptually viewed as "unqueueable," and therefore require quiescing of the NCQ work queue before being successfully processed. One skilled in the art will appreciate that various additional modifications are possible without departing from the scope of the present disclosure.

Conclusion

The disclosed systems and methods for utilization of notification or ordering commands can enable more efficient processing of flush requests from software programs. Further, the disclosed systems and methods may increase data consistency in storage devices, especially in instances where flush requests would otherwise be ignored by storage devices (due to their typical inefficiency). Specifically, the utilization of notification or ordering commands can enable applications to ensure that previous data items have been committed to non-volatile memory prior to completion. However, in contrast to existing flush mechanisms, the notification and ordering commands disclosed herein can enable data consistency without requiring quiescing of a work queue or monopolization of a communication bus. Moreover, the targeted notifications disclosed herein can limit the scope of a flush request, such that the speed and efficiency of the request are increased relative to a non-specific full-cache flush. Still further, the ordering commands disclosed herein can enable near immediate success of an application's flush requests, without reducing the consistency of the data. Such increases in efficiency of flush requests may greatly increase the speed and efficiency of storage devices, and consequently the performance of programs utilizing such storage devices.

Other Variations

Those skilled in the art will appreciate that in some embodiments, additional or alternative modules can be used to perform compression and formatting. Mapping units, compressed mapping units, and/or virtual storage units can include additional or alternative fields. The actual steps taken in the disclosed processes, such as the routines illustrated in FIGS. 5A-5B and 6, may differ from those shown in the figures. Additional system components can be utilized, and disclosed system components can be combined or omitted. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM ("Dynamic Random Access Memory") or SRAM ("Static Random Access Memory"), battery backed-up volatile DRAM or SRAM devices, EPROM ("Erasable Programmable Read-Only Memory"), EEPROM ("Electrical EPROM"), etc.) may additionally or alternatively be used. As another example, the various components illustrated in the figures may be implemented as software and/or firmware on a processor, ASIC/FPGA, or dedicated hardware. Hardware components, such as processors, ASICs, FPGAs, and the like, can have logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that will be apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A computer-implemented method to manage consistency of data in a data cache of a storage device, the computer-implemented method comprising:
    receiving a request from a software program to flush the data cache;
    generating a notification command that, when executed by the storage device, generates a notification indicating writing of at least one data item within the data cache to a non-volatile memory, wherein the notification command identifies the at least one data item based at least in part on an identifier of the at least one data item;
    transmitting the notification command to the storage device via a communication link;
    receiving the notification from the storage device; and
    transmitting to the software program an indication of completion of the request to flush the data cache.

2. The computer-implemented method of claim 1, wherein the communication link is at least one of a system bus, a storage bus, or a communication network.

3. The computer-implemented method of claim 1, wherein the communication link utilizes at least one of a serial ATA (SATA) standard, advanced host controller interface (AHCI) standard, or a non-volatile memory express (NVMe) standard.

4. The computer-implemented method of claim 1, wherein the at least one data item is associated with a request to write data generated by the software program, and wherein the method further comprises:
    prior to receiving the request from the software program to flush the data cache:
        selecting the identifier based at least in part on the request to write data; and
        transmitting the identifier and the at least one data item to the storage device.

5. The computer-implemented method of claim 4, wherein the identifier is selected based at least in part on metadata associated with the request to write data.

6. The computer-implemented method of claim 5, wherein the metadata indicates at least one of an identity of the software program, a reference location to which the at least one data item is to be written, and a pre-existing identifier of the at least one data item.

7. The computer-implemented method of claim 1, wherein the identifier is a designated identifier used to prevent writing of the at least one data item if it is determined that the request is associated with a page file.

8. The computer-implemented method of claim 1, wherein the identifier is associated with a plurality of data items within the data cache.

9. The computer-implemented method of claim 8, wherein the plurality of data items are associated with at least one of: an individual file or the software program.

10. The computer-implemented method of claim 1, wherein the software program is at least one of: a software application or an operating system.

11. A system comprising:
a communication interface associated with a host system and configured to transmit communications between the host system and a storage system; and
a processor associated with the host system and configured with specific computer-executable instructions that, when executed by the processor, cause the processor to:
receive a request from a software program to flush a data cache of the storage system;
generate a notification command that, when executed by the storage system, generates a notification indicating writing of at least one data item within the data cache to a non-volatile memory of the storage system, wherein the notification command identifies the at least one data item based at least in part on an identifier of the at least one data item;
transmit the notification command to the storage system via the communication interface;
receive the notification from the storage system; and
transmit to the software program an indication of completion of the request to flush the data cache.

12. The system of claim 11, wherein the at least one data item is associated with a request to write data generated by the software program, and wherein the computer-executable instructions further cause the processor to:
prior to reception of the request from the software program to flush the data cache:
select the identifier based at least in part on the request to write data;
transmit the identifier to the storage system; and
transmit the at least one data item to the storage system for storage in the data cache.

13. The system of claim 12, wherein the identifier is selected based at least in part on metadata associated with the request to write data.

14. The system of claim 13, wherein the metadata indicates at least one of an identity of the software program, a location to which the at least one data item is to be written, or a pre-existing identifier of the at least one data item.

15. The system of claim 11, wherein the identifier is a designated identifier used to prevent writing of the at least one data item if it is determined that the request is associated with a page file.

16. The system of claim 11, wherein the identifier is associated with a plurality of data items within the data cache.

17. The system of claim 16, wherein the plurality of data items are associated with at least one of: an individual file or the software program.

18. A non-transitory computer-readable medium including computer-executable instructions that, when executed by a computing device, cause the computing device to:
receive a request from a software program to flush a data cache of a storage system;
generate a notification command that, when executed by the storage system, generates a notification indicating writing of at least one data item within the data cache to a non-volatile memory, wherein the notification command identifies the at least one data item based at least in part on an identifier of the at least one data item;
transmit the notification command to the storage system via a communication interface;
receive the notification from the storage system; and
transmit to the software program an indication of completion of the request to flush the data cache.

19. The non-transitory computer-readable medium of claim 18, wherein the at least one data item is associated with a request to write data generated by the software program, and wherein the computer-executable instructions further cause the computing device to:
prior to reception of the request from the software program to flush the data cache:
select the identifier based at least in part on the request to write data;
transmit the identifier to the storage system; and
transmit the at least one data item to the storage system for storage in the data cache.

20. The non-transitory computer-readable medium of claim 19, wherein the identifier is selected based at least in part on metadata associated with the request to write data.

21. The non-transitory computer-readable medium of claim 20, wherein the metadata indicates at least one of an identity of the software program, a location to which the at least one data item is to be written, or—a pre-existing identifier of the at least one data item.

22. The non-transitory computer-readable medium of claim 18, wherein the identifier is a designated identifier used to prevent writing of the at least one data item if it is determined that the request is associated with a page file.

23. The non-transitory computer-readable medium of claim 18, wherein the identifier is associated with a plurality of data items within the data cache.

24. The non-transitory computer-readable medium of claim 23 wherein the plurality of data items are associated with at least one of: an individual file or the software program.

* * * * *